(12) United States Patent
Li

(10) Patent No.: US 8,259,704 B2
(45) Date of Patent: Sep. 4, 2012

(54) SYSTEM AND METHOD FOR LOAD SHARING AMONG A PLURALITY OF RESOURCES

(75) Inventor: San-Qi Li, Plano, TX (US)

(73) Assignee: Genband US LLC, Plano, TX (US)

( * ) Notice: Subject to any disclaimer, the term of this patent is extended or adjusted under 35 U.S.C. 154(b) by 854 days.

(21) Appl. No.: 11/112,585

(22) Filed: Apr. 22, 2005

(65) Prior Publication Data

US 2006/0239243 A1  Oct. 26, 2006

(51) Int. Cl.
*H04L 12/66* (2006.01)
(52) U.S. Cl. ........................ 370/352
(58) Field of Classification Search .......... 370/352, 370/270; 709/226–231, 203, 223, 204; 725/109, 725/116
See application file for complete search history.

(56) References Cited

U.S. PATENT DOCUMENTS

| | | | |
|---|---|---|---|
| 6,061,348 A | 5/2000 | Castrigno et al. | |
| 6,064,653 A * | 5/2000 | Farris | 370/237 |
| 6,208,657 B1 * | 3/2001 | Dendi et al. | 370/401 |
| 6,442,758 B1 * | 8/2002 | Jang et al. | 725/119 |
| 6,633,563 B1 | 10/2003 | Lin et al. | |
| 6,714,535 B1 | 3/2004 | Herh | |
| 6,771,673 B1 | 8/2004 | Baum et al. | |
| 6,879,667 B1 | 4/2005 | Carew et al. | |
| 7,010,002 B2 * | 3/2006 | Chow et al. | 370/485 |
| 7,177,943 B1 | 2/2007 | Temoshenko et al. | |
| 7,185,094 B2 | 2/2007 | Marquette et al. | |
| 7,212,519 B2 | 5/2007 | Johnson et al. | |
| 7,304,984 B2 * | 12/2007 | Butler et al. | 370/352 |
| 7,424,025 B2 | 9/2008 | Qian et al. | |
| 7,466,691 B2 * | 12/2008 | Piercy et al. | 370/352 |
| 2002/0012352 A1 | 1/2002 | Hansson et al. | |
| 2002/0016926 A1 | 2/2002 | Nguyen et al. | |
| 2002/0027983 A1 | 3/2002 | Suzuki | |
| 2002/0051464 A1 | 5/2002 | Sin et al. | |
| 2002/0172221 A1 | 11/2002 | Dale et al. | |
| 2002/0191612 A1 | 12/2002 | Curtis | |
| 2003/0093555 A1 | 5/2003 | Harding-Jones et al. | |
| 2003/0118039 A1 | 6/2003 | Nishi et al. | |
| 2003/0142795 A1 | 7/2003 | Gavette et al. | |
| 2004/0066782 A1 | 4/2004 | Nassar | |

(Continued)

FOREIGN PATENT DOCUMENTS

WO  WO 2005/033889 A2  4/2005

(Continued)

OTHER PUBLICATIONS

Notification Concerning Transmittal of International Preliminary Report on Patentability (Chapter I of the Patent Cooperation Treaty) for International Application No. PCT/IB2006/000961 (Nov. 1, 2007).

(Continued)

*Primary Examiner* — Chandrahas Patel
(74) *Attorney, Agent, or Firm* — Jenkins, Wilson, Taylor & Hunt, P.A.

(57) ABSTRACT

A media gateway includes a non-packet switching matrix operable to switch non-packetized data, a packet switching matrix operable to switch packetized data, a plurality of processing resources coupled to the non-packet and packet switching matrices, each processing resource processing a substantially equal load of multimedia sessions processed by the media gateway without inactive protecting resources.

17 Claims, 2 Drawing Sheets

U.S. PATENT DOCUMENTS

| | | | |
|---|---|---|---|
| 2004/0240389 | A1 | 12/2004 | Bessis et al. |
| 2005/0074017 | A1 | 4/2005 | Qian et al. |
| 2007/0083528 | A1 | 4/2007 | Matthews et al. |

FOREIGN PATENT DOCUMENTS

| | | | |
|---|---|---|---|
| WO | WO 2005/034449 | A1 | 4/2005 |
| WO | WO 2005/034454 | A2 | 4/2005 |

OTHER PUBLICATIONS

International Search Report and Written Opinion of the international Searching Authority mailed Aug. 4, 2006 for PCT Application No. PCT/IB2006/000961, 9 pages.

Communication pursuant to Rules 161 and 162 EPC for European Patent Application No. 04789383.9 (Sep. 24, 2008).

International Search Report for International Application No. PCT/US04/32232 (Jun. 2, 2008).

Written Opinion of the International Searching Authority for International Application No. PCT/US04/32232 (Jun. 2, 2008).

Notice of Allowance and Fee(s) due for U.S. Appl. No. 10/676,233 (May 2, 2008).

Official Action for U.S. Appl. No. 10/676,233 (Nov. 28, 2007).

Official Action for U.S. Appl. No. 10/676,233 (Jun. 11, 2007).

Communication pursuant to Rules 109 and 110 EPC for European Application No. 04789383.9 (Aug. 22, 2006).

International Search Report and Written Opinion for International Application No. PCT/US04/31920 (Mar. 4, 2005).

International Search Report and Written Opinion for International Application No. PCT/US04/31918 (Feb. 11, 2005).

Yoo et al., "A Media Stream Processing of VoIP Media Gateway," IEEE, pp. 91-94 (2003).

European Search Report for European application No. 04789383.9 (Jul. 14, 2010).

Venkatachalam et al., "A Highly Flexible, Distributed Multiprocessor Architecture for Network Processing," Computer Networks, vol. 41, No. 5, pp. 563-586 (Apr. 5, 2003).

Dagiuklas et al., "Architecture and Design of an Enhanced H.323 VoIP Gateway," Proceedings of IEEE International Conference on Communications, vol. 2, pp. 1209-1213 (Apr. 28, 2002).

Communication pursuant to Article 94(3) EPC for European application No. 04789383.9 (Nov. 23, 2010).

* cited by examiner

SYSTEM AND METHOD FOR LOAD SHARING AMONG A PLURALITY OF RESOURCES

BACKGROUND

Traditional protection schemes in telecommunications systems provide a subset of standby or inactive resources for a subset of active resources. These schemes are often called 1:1 where there is one standby resource for every active resource, 1:N where there is one standby resource for every N active resources, and M:N where there are M standby resource for every N active resources. In these systems, only the active resources are used to process or provide services to communication sessions such as VoIP calls. Because of the redundancy required for these protection schemes, they are costly to implement. Further, when a failure occurs, switchover of a large number of communication sessions from a failed resource to a protection resource often causes long delays and subsequent degradation of service.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
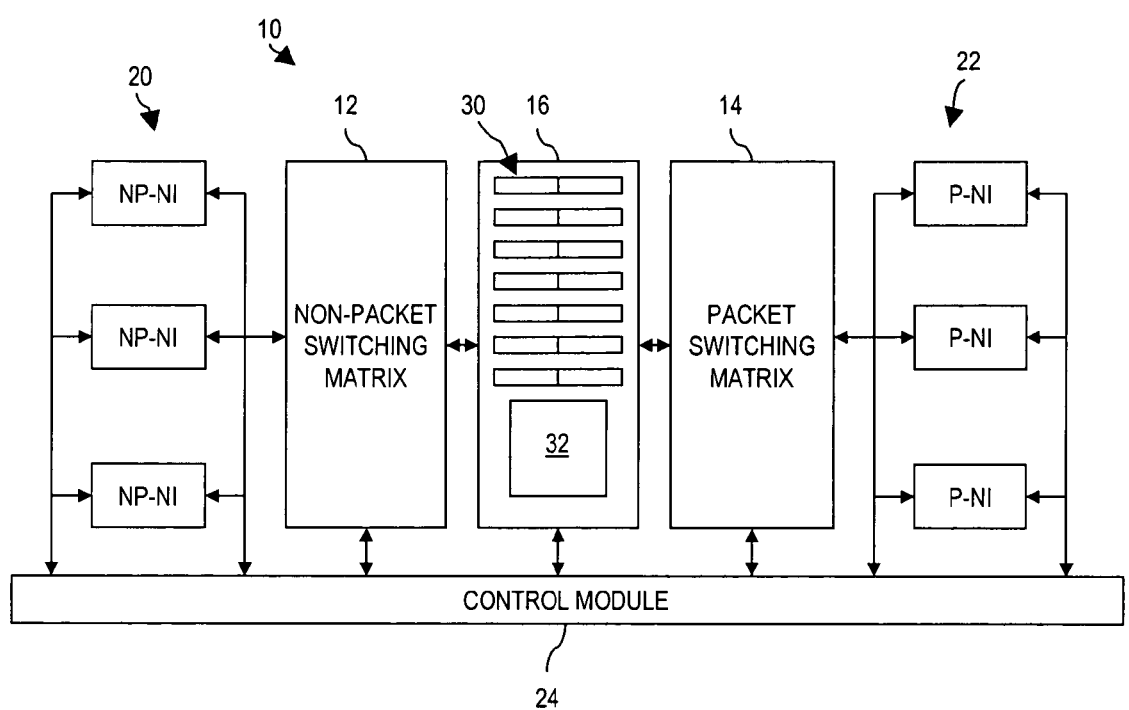
FIG. 1 is a simplified block diagram of an embodiment of a media gateway.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a simplified block diagram of an embodiment of a media gateway 10. Media gateway 10 may include, be, or be employed with one or more switches and/or other switching fabric components, internet-protocol (IP) and/or other gateways, channel banks, and/or other devices. The media gateway may convert data, on a per session basis, from a format, protocol, and/or type required for one network to another format, protocol, and/or type required for another network, and/or otherwise convert data, on a per session basis, from a first type of data on a first transmission link to a second type of data on a second transmission link. The media gateway may switch sessions from a circuit-switched network and through appropriate streaming media processing, to a packet-switched network, such as real-time-transport-protocol (RTP) streams in an IP network. Such session-based data for the media gateway may include audio, video, and/or T.120 (real-time multi-point communications), among others, which the media gateway may handle simultaneously or otherwise.

Media gateway 10 may be deployed in conjunction with a media gateway controller, which is sometimes referred to as a softswitch. In some embodiments, the softswitch may include, be, or be employed with software for open application interface (API—also possibly referred to as application program interface or application programming interface), or through standard protocols such as H.248, MGCP and SIP.

As employed herein, a network may refer to an entire network or to a network portion, a network application, and/or network apparatus. To that end, one or more instances of the media gateway and/or softswitch, or components thereof, may be singularly or collectively employed to bridge two or more networks, including those of public switched telephone networks (PSTNs) and voice-over-packet (VoP) networks, wireless and wireline networks, among others. PSTN networks may employ time-division multiplexing (TDM), among other non-packet formats and/or protocols. VoP networks may employ asynchronous transfer mode (ATM), and voice-over-internet-protocol (VoIP), other formats and/or protocols, and/or combinations thereof, in wireless and wireline networks that include but not limited to universal-mobile-telecommunications-service (UTMS), Global System for Mobile (GSM), code-division-multiple-access (CDMA, CDMA2000 and/or W-CDMA), and voice-over-digital-subscriber-line (VoDSL).

Media gateway 10 may include one or more switching matrices, such as a non-packet switching matrix (NP-SM) 12 and a packet switching matrix (P-SM) 14 each coupled to a multi-service module 16 (MSM) for per session media processing. Media gateway 10 may further include any number of network interfaces coupled to the switching matrices 12 and 14, wherein each of the network interfaces may include one or more non-packet network interface (NP-NI) 20 and/or one or more packet network interface (P-NI) 22. The media gateway 10 may also include a control module 24 in communication with and/or configured to control one or more of the NP-NI 20, NP-SM 12, MSM 16, P-SM 14, and P-NI 22.

The switching matrices 12 and 14 are operable to switch data in a plurality of formats. The per session data passed between data transmission links by the switching matrices may include universal-mobile-telecommunications-service (UMTS) data, time-division-multiplexed (TDM) data, voice-over-internet-protocol (VoIP) data, asynchronous-transfer-mode (ATM) data in the form of AAL1, AAL2 or AAL2 at adaptation layer, and voice-over-packet (VoP) data, in both wireless and wireline networks, for example.

The switching matrices may be configured to perform circuit switching (e.g., TDM data circuit switching, among others), such as to obtain a physical path dedicated to a connection between two intermediate or end-points for the duration of the session, including simultaneously performing packet switching (e.g., UMTS data packet switching, among others) to provide connectionless or non-dedicated communication on a per session basis. Virtual circuit switching may also be achieved via the switching matrices, such as may provide a dedicated logical connection which doesn't prevent sharing a physical path among multiple connections. Such virtual circuit switching may establish or support establishing a logical connection on a dedicated basis for some finite, predetermined or calculated duration, and may also support permanent virtual circuits which reserve the logical connection on an indefinite or ongoing basis.

The packet switching matrix 14 may receive packet signals from the P-NI 22, including packet signals from a variety of different types of packet signals, possibly including wireless packet signals. For example, the P-NI 22 may be configured to receive (and send) one or more of ATM signals, VoIP signals, and/or UMTS signals, among others. In some embodiments, a separate P-NI 22 may be employed for each type of packet signal that the media gateway 10 is intended or adapted to handle. For example, the media gateway 10 may include one or more P-NIs 22 dedicated to sending and receiving packet signals from one or more ATM networks, an additional one or more P-NIs 22 dedicated to sending and receiving packet signals from one or more VoIP networks, and an additional one or more P-NIs 22 dedicated to sending and receiving packet signals from one or more UMTS or other wireless networks. Each P-NI 22 employed in the media gateway 10 to send and receive packet signals from a wireless network may be or include a wireless network interface which may be substantially similar to the network interfaces described above, possibly including being configured to provide format, protocol, and signaling conversion between wireless signals and the packet signals.

The NP-NI 20 is configured to directly or indirectly interface with a non-packet network. For example, the NP-NI 20 may permit the transfer of TDM voice, session, data session as for CDS service in UMTS, and/or signaling (hereafter collectively referred to as data) into and out of the media gateway 10. Thus, the NP-NI 20 may be connected, or able to be connected, to a network, such as through one or more electrically conductive cables and/or fiber-optic cables, among other connection means. For the sake of simplicity, such cables may be referred to hereafter as copper and/or fiber lines, although other types of cables are also within the scope of the present disclosure. The NP-NI 20 may be coupled to the copper/fiber lines by modular, possibly detachable connectors, or jacks, although other connection means are also possible, including more permanent or non-detachable connection means.

In some embodiments, one or more NP-NI 20 may be configured to provide varying speeds and redundancies, the selection of which may be tailored to a particular application. For example, one embodiment of the media gateway 10 may include NP-NIs 20 of sufficient number and/or configuration to support one, several, or all of the following speeds, among others: (1) T1/E1; (2) DS-3/E3; (3) OC-3/STM-1o; and (4) OC-12/STM-4o.

In some embodiments, the NP-NI 20 is configured to handle any type of non-packet data, including TDM and others, although in other embodiments the NP-NI 20 may be configured to handle only one or more certain types of non-packet data. Such limitations may result from specific design requirements or goals, customer specifications, application or environment demands or intricacies, manufacturing or market constraints, or other reasons. Similarly, the NP-NI 20 may also be configured to handle any one or more of various non-packet voice session protocols, including GR-317, GR-394, GR-444, Q.931 PRI N12, DMS, 5ESS, D4, MF, DTMF, GR-303/V5.2, TR08, among others.

The NP-NI 20 may be implemented as a line-replaceable unit, such as a card, circuit board, or other module possibly having a standard and/or common interface with corresponding structure/electronics in the media gateway 10. Consequently, as needs for additional non-packet formats are identified, a replacement or additional NP-NI 20 addressing such needs may be easily installed in the media gateway 10, including after the initial design, manufacturing, deployment, installation, initialization and/or ongoing operation of the media gateway 10. In some embodiments, additional programming may be necessary to manipulate data in the additional non-packet format. The additional programming may be accomplished in the NP-NI 20, such that the media gateway 10 as a whole may continue to operate. The additional programming may additionally or alternatively be accomplished in other components of the media gateway 10, such as the control module 24.

The NP-NI 20 may be configured to handle both inbound and outbound per session traffic. For example, the NP-NI 20 may receive data external to the media gateway 10, such as from a network to which the media gateway 10 is connected, and may also receive data internal to the media gateway 10. Consequently, the NP-NI 20 may also send data external to the media gateway 10, such as to a network connected thereto, and may also send data internal to the media gateway 10. In other words, the NP-NI 20 may be a two-way traffic port, supporting bidirectional traffic flow into and away from the media gateway 10.

The non-packet switching matrix 12 is configured to receive TDM per session data and/or other non-packet data from one or more NP-NI 20. Consequently, the non-packet switching matrix 12 may transmit non-packet per session data after appropriate switching has been performed. One possible destination for data transmitted by the non-packet switching matrix 12 is a processing resource or module 30 of the multi-service module 16, and/or one or more other resources or components of the multi-service module 16.

The multi-service module 16 comprises a plurality of processing resources 30. The multi-service module 16 may be configured to receive packet per session data and non-packet per session data, or to receive per session data originating from both packet and non-packet data sources. The plurality of processing resources 30 may perform one or more digital data processing functions, such as voice encoding/decoding, echo cancellation, and signal conversion between one or more non-packet modes and/or one or more packet modes on a per session basis. For example, the processing resources 30 may perform the appropriate conversion between TDM, ATM, UMTS, and IP formats to support TrFO, TFO, Iu-Nb interworking, CSD (circuit switched data) and CTM (cordless terminal mobility) capabilities in wireless networks. The resources within a multi-service module may be logically or physically grouped based on the type of function or service each resource provides, such as codec service (e.g., G.729, AMR, EVRC), TFO, TrFO, CSD, VQE and T.38 services.

Per session conversion between native forms by the multi-service module 16 may include converting the incoming signal from its native form into a common format or generic form, which may be identical or substantially similar to one of the native formats, a standard format, or a modified version of a standard format. The common or generic form may also or alternatively be custom-tailored, designed, or created for the multi-service module 16 and/or the media gateway 10 or portion thereof, such as in accord with a high-level data link control (HDLC) format or protocol, or a modified portion or version thereof. In any case, the common data format may be capable of holding per-channel or per-session data converted from multiple various types of formats, including multiple wireless and wired or wireline formats.

The processing resources 30 of the multi-service module 16 may also support or enable conference bridging, tone detection/generation, and announcement possibly by conventional and/or future-developed processing on a per session basis. The processing resources 30 of the multi-service module 16 may also support or enable signal encapsulation. An example of such signal encapsulation includes the encapsulation of per session data in HDLC frames. Some embodiments of such encapsulation or framing employ a modified version of HDLC in which a specific number of bits and/or bytes, possibly of predetermined values, are included in one or more or all HDLC frames. Such embodiments may be employed to split words or other data portions of each session data into smaller portions, when necessary, possibly prior to performance of the processing performed by the multi-service module 16. The additional bits and/or bytes may then be employed to reassemble the smaller portions of per session data into the desired larger format. The processing resources 30 may also include segmentation and reassembly (SAR) resources.

The multi-service module 16 may also include a switching matrix 32 configured to handle non-packet per session data, such that TDM or other non-packet per session data switched by the non-packet switching matrix 12 may be directly communicated between the two switching matrices. In some embodiments, the switching matrix 32 integral to the multi-service module 16 may be configured to handle per session data from any data source, including non-packet data sources and packet data sources, although such per session data may require conversion to a common format prior to handling by the switching matrix 32 integral to the multi-service module 16.

The per session processing resources 30 of the multi-service module 16 are herein defined to be a plurality of resources that perform some processing tasks as described above as well as others that are not explicitly described herein. The plurality of per session processing resources 30 of the multi-service module 16 may be embodied in hardware, software, and/or software. The plurality of processing resources 30 may comprise digital signal processing chips, field programmable devices, and/or other implementations. A media gateway may support different types of multi-service modules and one such multi-service module may contain different versions of software and hardware components.

After the multi-service module 16 completes any necessary, desired, or predetermined switching and/or other processing, the processed per session signal may be sent to one of the non-packet switching matrix 12 or the packet switching matrix 14 to complete the necessary session switching. Moreover, the switching may be between any of possibly four or more wired and/or wireless sources, such as a UMTS data source, a VoIP data source, an ATM data source, and a TDM data source, on a per-voice channel or per-multimedia session basis.

The control module 24 is configured to send and/or receive requests/messages from the multi-service module 16, the non-packet switching matrix 12, the packet switching matrix 14, and/or any of the network interfaces 20 and 22. The control module 24 may then process each request and determine an appropriate action, such as switching between standby and operation states, collecting data, allocating resources, among others, according to network conditions and predefined rules, all on per-channel or per-multimedia session basis, among other possible considerations. Consequently, the control module 24 (or components thereof) may be in direct or indirect communication with the multi-service module 16, the non-packet switching matrix 12, the packet switching matrix 14, and/or any of the network interfaces 20 and 22, and may send commands and/or instructions thereto.

A wireless network interface, which may be part of, substituted for, or employed in addition to, a wired P-NI 22 or a wired NP-NI 20, may be configured to receive wireless data from a radio access network or other networks which may employ packet or TDM data to support 2G networks (e.g., CDMA and GSM) or 3G networks (e.g., UMTS and CDMA2000). Such a wireless network interface may perform error checking, data framing and other functions. The wireless network interface may also be configured to subsequently send received data packets to the packet switching matrix 14.

Figure 2:
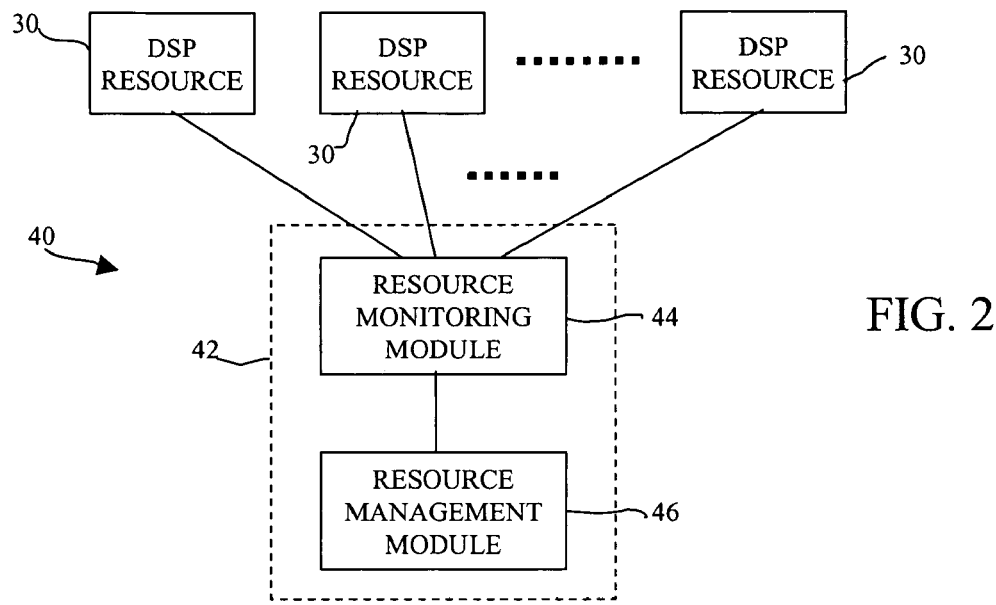
FIG. 2 is a simplified logical block diagram of an embodiment of a system for load sharing among a plurality of resources in the media gateway.

FIG. 2 is a simplified logical block diagram of an embodiment of a system 40 for load sharing among a plurality of per session processing resources 30 in media gateway 10, for example. The traditional practice for load sharing among a plurality of resources is to divide the resources into active and standby pools to achieve a 1:1 or 1:N protection scheme. This technique provides full redundancy for active resources. A problem for this protection scheme is the long delay and subsequent degradation in service when a large number of communication sessions are switched over from one or more failed resources to one or more protecting resources. A second problem is the large number of costly redundant standby resources required by this protection scheme. A load sharing control system 40 addresses both of these issues.

The load sharing control system 40 may be a component of the control module 24 and comprises a resource monitoring module 44 communicatively coupled to each of the plurality of per session resources 30 and to a per session resource management module 46. Resource monitoring module 44 is operable to receive per session status data from the resources 30 that indicate the per session operational state of the resources. The per session status data may include a utilization data indicative of the amount of usage at a resource and data indicative of one or more failures taking place at the resource. The per session resource management module 46 is operable to make switchover and load redistribution decisions in response to the per session status data.

Figure 3:
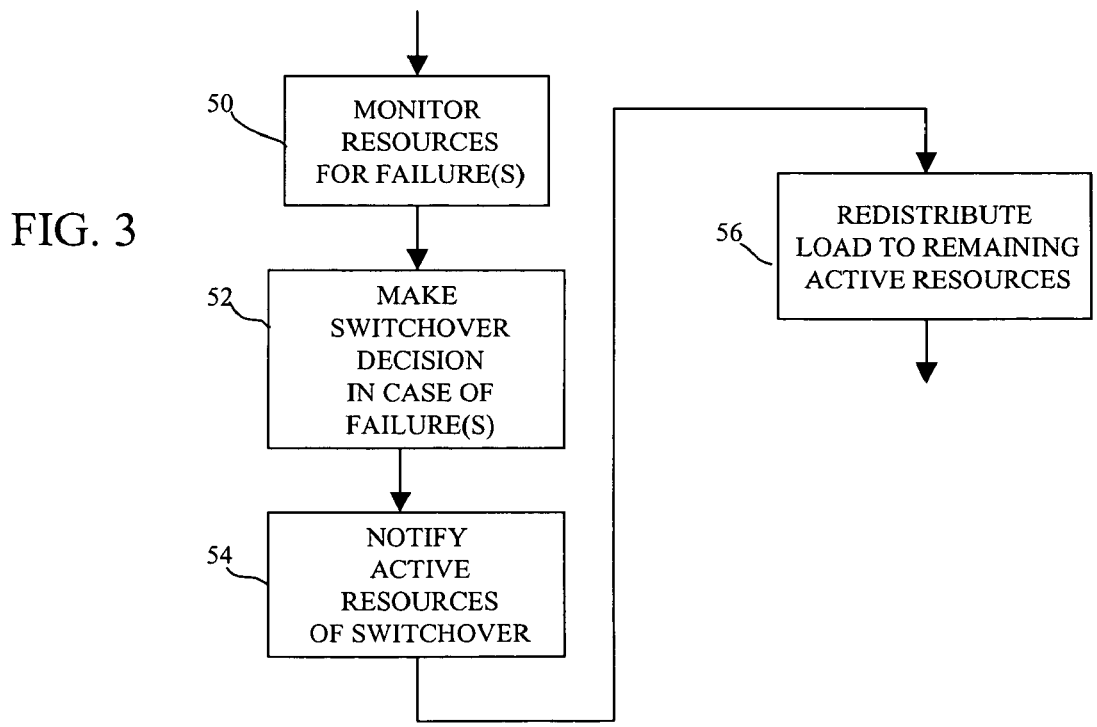
FIG. 3 is a simplified flowchart of an embodiment of a process for load sharing among a plurality of resources in the media gateway.

FIG. 3 is a simplified flowchart of an embodiment of a process for load sharing among a plurality of resources. Rather than having a pool of active resources and a pool of standby resources serving as protection for the active resources, the plurality of DSP resources 30 in system 10 are all actively processing communication signals for all in-progress sessions. The processing load of these sessions is substantially evenly distributed among the plurality of resources 30. In step 50, per session status data is received by resource monitoring module 44. Alternatively, the resource managing module may receive per session status reports from the resources. Based on the received per session status data, the resource monitoring module 44 or the resource managing module makes a determination as to whether any change in status has occurred that required a redistribution of the load on a per session basis. For example, if a failure has been detected at one of the plurality of resources, then the load of those affected session that has been carried by that resource will need to be redistributed to the remaining resources. In step 52, the switchover decision is made in response to detected changes in operational status such as failures. A determination may be made as to how the processing load of the affected sessions carried by the failed resource should be redistributed. The remaining active resources are notified by the resource management module 46 of the switchover in step 54. In step 56, the load of the affected session processed by the failed resource is redistributed among the remaining operational resources.

In this switchover scheme, the processing load carried by each resource is lower since there are no idle standby resources. Upon detecting a failure, the smaller load processed by the failed resource may be more quickly redistributed to all the remaining functioning resources. Significant time savings are achieved in load redistribution during switchovers as compared to the conventional 1:N schemes. Upon a new session establishment or re-arrangement of an existing session as caused by call forwarding or call handover, the resource manager decides which multi-service module and which resource on the module will be applied to support the corresponding service of the session. Upon a hardware or software failure, which may disable either a portion of the resources on the multi-service module or the entire module, the existing session impacted by the failure will be instantaneously moved to the other available resources within the same module and/or other multi-service modules, depending on the specific circumstances. Moreover, with multiple different versions of multi-service modules in a system, which is a likely operation scenario during network expansion, the conventional 1:N or 1:1 protection schemes add substantial cost and reduce overall system capacity. In contrast, the disclosed load sharing protection scheme supports dynamic sharing of different versions of multi-service modules.

Although embodiments of the present disclosure have been described in detail, those skilled in the art should understand that they may make various changes, substitutions and alterations herein without departing from the spirit and scope of the present disclosure. Accordingly, all such myriad changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A media gateway, comprising:
a non-packet switching matrix located in the media gateway and operable to switch non-packetized voice data;
a packet switching matrix located in the media gateway and operable to switch packetized voice data;
a plurality of processing resources located in the media gateway and coupled to the non-packet and packet switching matrices, each processing resource processing a substantially equal load of multimedia sessions processed by the media gateway without inactive protecting resources, wherein each of the plurality of processing resources located in the media gateway is configured to perform at least two of: voice encoding/decoding, echo cancellation, and signal conversion on a per session basis and wherein the non-packet switching matrix is operable to switch the non-packetized voice data between non-packet network interfaces of the media gateway and the processing resources located in the media gateway and wherein the packet switching matrix is configured to switch the packetized voice data to and from packet network interfaces of the media gateway and the processing resources located in the media gateway; and
a control module located in the media gateway and coupled to the plurality of processing resources and operable to receive per session operational status data from the plurality of processing resources and, in response to receiving per session status data indicative of a failed processing resource, to redistribute the load of voice sessions of the failed processing resource among all of the remaining operational processing resources, wherein the media gateway is deployed in conjunction with a media gateway controller.

2. The media gateway of claim 1, further comprising a plurality of network interface units coupling the non-packet switching matrix to a network.

3. The media gateway of claim 1, further comprising a plurality of network interface units coupling the packet switching matrix to a network.

4. The media gateway of claim 1, wherein the plurality of processing resources are operable to perform data encapsulation.

5. The media gateway of claim 1, further comprising a resource management module operable to maintain the state of the re-distributed multimedia sessions.

6. A method of distributing processing load among a plurality of processing resources, comprising:
distributing processing load of a plurality of in-progress media sessions substantially equally among all of a plurality of processing resources within a media gateway, wherein each of the plurality of processing resources located in the media gateway is configured to perform at least two of: voice encoding/decoding, echo cancellation, and signal conversion on a per session basis and wherein the media gateway includes a packet switching matrix for switching packet voice data and a non-packet switching matrix for switching non-packetized voice data, both coupled to the processing resources and to network interfaces that couple the media gateway to external networks, and wherein the media gateway is deployed in conjunction with a media gateway controller, wherein the non-packet switching matrix is operable to switch the non-packetized voice data between non-packet network interfaces of the media gateway and the processing resources within the media gateway and wherein the packet switching matrix is configured to switch the packetized voice data to and from packet network interfaces of the media gateway and the processing resources within the media gateway;
at a control module within the media gateway:
receiving operational status of the plurality of processing resources identifying at least one failed processing resource; and
redistributing processing load of the media sessions formerly processed by the at least one failed processing resource substantially evenly among all of the remaining operational processing resources on a per session basis.

7. The method of claim 6, further comprising:
receiving voice session data of a first format at a first port;
converting the voice session data to a second format at one of the plurality of processing resources;
switching the voice session data to a second port; and
sending the converted voice session data from the second port to a network.

8. The method of claim 7, further comprising performing echo cancellation on the voice session data.

9. The method of claim 7, further comprising performing data encapsulation on the voice session data.

10. The method of claim 7, further comprising performing voice encoding/decoding on the voice session data.

11. The method of claim 6, further comprising:
receiving non-packetized voice session data of a first format at a first port;
converting the voice session data to a packetized second format at one of the plurality of processing resources;
switching the voice session data to a second port; and
sending the converted voice session data from the second port to a network.

12. The method of claim 6, further comprising:
receiving voice session data at a first port;
processing the voice session data at a first one of the plurality of processing resources;

processing the voice session data at a second one of the plurality of processing resources;
switching the voice session data to a second port; and
sending the processed voice session data from the second port to a network.

13. The method of claim 6, further comprising notifying the remaining operational processing resources of a pending processing load redistribution.

14. The method of claim 6, further comprising monitoring the per session status of the plurality of processing resources.

15. The method of claim 6, further comprising receiving per session status data comprising utilization data from the plurality of processing resources.

16. The method of claim 6, further comprising receiving status data comprising data identifying a failed resource and associated impacted sessions from the plurality of processing resources.

17. The method of claim 6, further comprising:
receiving packetized voice session data of a first format at a first port; converting
the voice session data to a non-packetized second format at one of the plurality of processing resources;
switching the voice session data to a second port; and
sending the converted voice session data from the second port to a network.

* * * * *